Oct. 8, 1940.                H. C. AMIDON                2,217,093
                            SKULL SEPARATOR
                         Filed Feb. 29, 1940

H. C. Amidon
INVENTOR.
BY
ATTORNEYS.

Patented Oct. 8, 1940

2,217,093

UNITED STATES PATENT OFFICE 2,217,093

SKULL SEPARATOR

Hugh C. Amidon, Elyria, Ohio

Application February 29, 1940, Serial No. 321,586

3 Claims. (Cl. 266—37)

This invention relates to a skull separator, the primary object of the invention being to provide means removably held within a slag pot for dividing the steel or skull that overflows into the slag pot, into small sections, facilitating the handling of the skull.

An important object of the invention is to provide a device of this character which may be readily lifted from the slag pot, and the metal removed therefrom.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawing.

Figure 1:
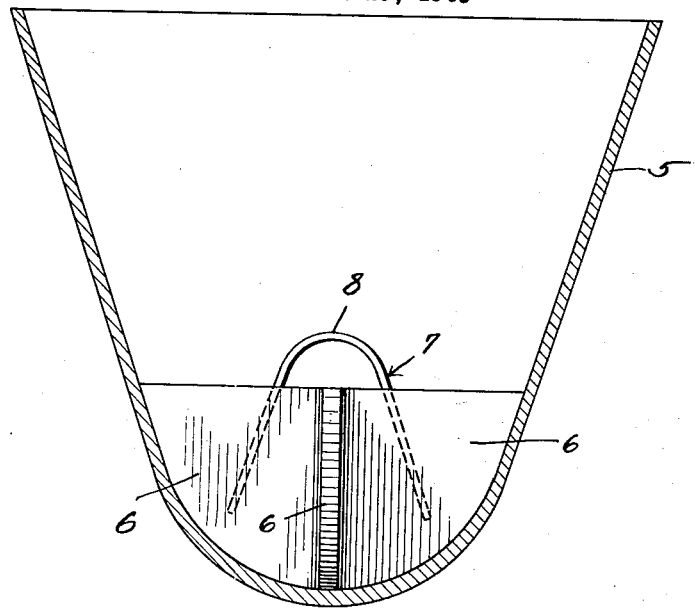
Figure 1 is a vertical sectional view through a slag pot, illustrating a skull separator, positioned therein and constructed in accordance with the invention.
Figure 2:
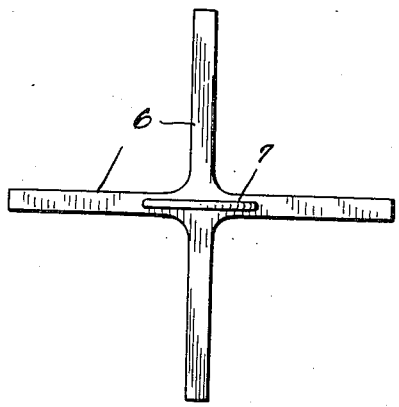
Figure 2 is a plan view of the skull separator.

Referring to the drawing in detail, the reference character 5 designates a slag pot into which the skull overflows from the usual melting pot in which the metal is being heated.

Figure 3:
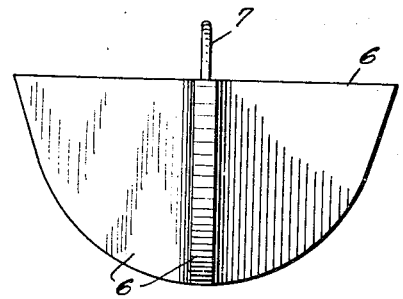
Figure 3 is an elevational view of the skull separator.

The separator comprises a solid body portion embodying wide members 6 that have their edges curved, as clearly shown by Figure 3 of the drawing, to fit within the usual curved bottom of a slag pot. These wide members 6 are disposed at right angles with respect to each other providing spaces between adjacent side faces of the members 6, for the reception of the molten skull which overflows into the slag pot.

The reference character 7 designates the bale of the separator, and comprises a rod that has its ends embedded in the upper surface of certain of the wide members 6, as shown by Figure 1, leaving the portion 8 thereof as spaced from the body portion, so that a hook may be readily positioned therein to remove the separator, from the slag pot.

From the foregoing it will be seen that due to the construction shown and described, the skull or metal which overflows into the slag pot, will be divided by the wide members 6, into substantially small sections or blocks, to permit the handling of the skull or cooled metal, with facility.

After the sections of the cooled skull have been removed from the separator, the separator is again positioned within the slag pot, to divide the skull or metal which overflows into the slag pot, during the melting operation.

What is claimed is:

1. A separator adapted for positioning in a slag pot, comprising a body portion, a plurality of partitioning members extended at right angles with respect to each other, the outer ends of the partitioning members being curved conforming to the shape of the bottom of the slag pot in which the separator is positioned, and a bale on the separator by means of which the separator may be removed from the slag pot.

2. A separator adapted for positioning in a slag pot, comprising a body portion, a plurality of partitions radiating from the body portion and extended at right angles with respect to each other, and said partitions adapted to contact with the inner surface of the slag pot, dividing the bottom of the slag pot into a plurality of compartments.

3. A removable separator adapted to be positioned in a slag pot, comprising a body portion, a plurality of partitions radiating from the body portion, the outer edges of the partitions being curved and adapted to rest against the inner surface of the slag pot in which the device is positioned, dividing the material overflowing into the slag pot, into equal parts.

HUGH C. AMIDON.